US008671920B2

(12) United States Patent
Hayman et al.

(10) Patent No.: US 8,671,920 B2
(45) Date of Patent: Mar. 18, 2014

(54) INTERNAL COMBUSTION ENGINE

(75) Inventors: Alan W. Hayman, Romeo, MI (US); Robert S. McAlpine, Lake Orion, MI (US)

(73) Assignee: GM Global Technology Operations LLC, Detroit, MI (US)

(*) Notice: Subject to any disclaimer, the term of this patent is extended or adjusted under 35 U.S.C. 154(b) by 353 days.

(21) Appl. No.: 13/220,187

(22) Filed: Aug. 29, 2011

(65) Prior Publication Data

US 2012/0048244 A1    Mar. 1, 2012

Related U.S. Application Data

(60) Provisional application No. 61/378,557, filed on Aug. 31, 2010.

(51) Int. Cl.
F02M 25/07 (2006.01)
(52) U.S. Cl.
USPC .................... 123/568.11; 123/58.8
(58) Field of Classification Search
USPC ............. 123/58.7, 58.8, 65 P, 560, 123/568.11–568.13, 568.17, 568.22, 123/568.28, 568.3; 701/108
See application file for complete search history.

(56) References Cited

U.S. PATENT DOCUMENTS

| 3,924,576 | A | 12/1975 | Siewert |
| 4,506,633 | A | 3/1985 | Britsch |
| 4,614,175 | A | 9/1986 | Asayama |
| 4,727,849 | A | 3/1988 | Nishida et al. |
| 4,790,286 | A | 12/1988 | Nishida et al. |
| 5,217,229 | A | 6/1993 | Jaime |
| 6,286,467 | B1 | 9/2001 | Ancheta |
| 6,505,592 | B1 | 1/2003 | Hayman et al. |
| 6,668,779 | B2 | 12/2003 | Hendriksma et al. |
| 6,810,844 | B2 | 11/2004 | Sellnau |
| 7,028,648 | B2 | 4/2006 | Hasegawa et al. |
| 7,036,465 | B2 | 5/2006 | Burk et al. |
| 7,055,470 | B2 | 6/2006 | Kreuter et al. |
| 7,284,517 | B2 | 10/2007 | Lancefield et al. |
| 7,404,386 | B1 | 7/2008 | Raghavan et al. |
| 7,464,675 | B1 | 12/2008 | Schechter |
| 7,481,185 | B1 | 1/2009 | Park et al. |
| 7,610,890 | B2 | 11/2009 | Lettmann et al. |

(Continued)

FOREIGN PATENT DOCUMENTS

| DE | 3007746 A1 | 9/1981 |
| DE | 69301470 T2 | 10/1996 |
| EP | 1167715 A2 | 1/2002 |
| WO | 2008031939 A2 | 3/2008 |

OTHER PUBLICATIONS

Hundleby, G.E., "Development of a Poppet-Valved Two-Stroke Engine—The Flagship Concept", Ricardo Consulting Engineers Ltd., SAE International Paper No. 900802; Feb. 1, 1990; 6 pages.

*Primary Examiner* — John T. Kwon
*Assistant Examiner* — Johnny Hoang
(74) *Attorney, Agent, or Firm* — Cantor Colburn LLP

(57) ABSTRACT

An internal combustion engine comprises a cylinder configured to operate on a four-stroke combustion cycle, a dedicated EGR cylinder configured to operate on a two-stroke combustion cycle and an EGR supply conduit extending between an exhaust port of the dedicated EGR cylinder and the cylinder configured to operate on a four-stroke combustion cycle for delivery of exhaust gas exiting the dedicated EGR cylinder to the cylinder configured to operate on a four-stroke combustion cycle for combustion therein.

12 Claims, 3 Drawing Sheets

(56) References Cited

U.S. PATENT DOCUMENTS

| | | |
|---|---|---|
| 7,958,859 B2 | 6/2011 | Methley et al. |
| 8,113,158 B2 | 2/2012 | Lancefield et al. |
| 8,118,000 B2 | 2/2012 | Surnilla |
| 8,132,546 B2 | 3/2012 | Surnilla |
| 8,371,257 B2 | 2/2013 | Moon et al. |
| 2006/0112940 A1 | 6/2006 | Roberts, Jr. et al. |
| 2008/0017144 A1 | 1/2008 | Litorell et al. |
| 2008/0201059 A1 | 8/2008 | Bryant |
| 2008/0257104 A1 | 10/2008 | Lancefield et al. |
| 2009/0229569 A1 | 9/2009 | Glugla et al. |
| 2009/0241871 A1 | 10/2009 | Hibino et al. |
| 2009/0255492 A1 | 10/2009 | Clever et al. |
| 2009/0308070 A1 | 12/2009 | Alger, II et al. |
| 2010/0126443 A1 | 5/2010 | Schneider |
| 2010/0229838 A1* | 9/2010 | Sturman ............ 123/525 |
| 2011/0094462 A1* | 4/2011 | Durrett et al. ......... 123/58.1 |
| 2012/0042649 A1 | 2/2012 | Kaneko et al. |
| 2012/0048244 A1 | 3/2012 | Hayman et al. |
| 2012/0125282 A1 | 5/2012 | Hayman |
| 2012/0137997 A1 | 6/2012 | Hayman |
| 2012/0145097 A1 | 6/2012 | Hayman et al. |
| 2012/0145103 A1 | 6/2012 | Hayman et al. |
| 2012/0145111 A1 | 6/2012 | Hayman |

* cited by examiner though pages to emitting higher levels of NO_x emissions.

INTERNAL COMBUSTION ENGINE

CROSS-REFERENCES TO RELATED APPLICATIONS

This patent application claims priority to U.S. Provisional Patent Application Ser. No. 61/378,557 filed Aug. 31, 2010, which is incorporated herein by reference in its entirety.

FIELD OF THE INVENTION

Exemplary embodiments of the invention relate to internal combustion engines having exhaust gas recirculation systems and, more particularly to an internal combustion engine having a cylinder dedicated to the production and supply of recirculated exhaust gas to other cylinders of the engine.

BACKGROUND

With the increased focus on vehicle economy, particularly vehicle fuel economy, automotive manufacturers are turning to smaller, lighter vehicles and unique vehicle powertrains to boost efficiency. Recirculated exhaust gas ("EGR") is utilized in most conventional internal combustion engines to assist in the reduction of throttling losses at low loads, and to improve knock tolerance and reduce the level of oxides of nitrogen ("$NO_x$") in the exhaust gas at high engine loads. EGR is especially important as an emissions reducer in internal combustion engines that run lean of stoichiometry and thereby are prone to emitting higher levels of $NO_x$ emissions.

One proposition that has been considered in the construction of internal combustion engine systems is to utilize one of a plurality of cylinders as a dedicated EGR source. Specifically, in a four cylinder engine for instance, three of the four cylinders will run at normal air, fuel and EGR mixtures. The exhaust gas produced by these cylinders will exit the internal combustion engine as exhaust gas and be treated in an exhaust gas treatment system prior to its release to the atmosphere. On the other hand, one of the four cylinders will be run at customized levels of air and fuel; as may be determined by an engine controller that is in signal communication with various engine, vehicle and exhaust system sensors. The exhaust gas produced in the single cylinder will be transferred to the intake ports of the other three cylinders to provide EGR. Such a configuration allows for richer EGR that contains higher levels of hydrogen thereby improving knock resistance, fuel consumption and combustion stability while still allowing stoichiometric gas to be maintained in the exhaust gas treatment system for compatibility with the catalytic treatment devices.

A disadvantage to this type of internal combustion engine system is that a 4 cylinder internal combustion engine that uses only 1 cylinder as the dedicated EGR cylinder does not uniformly deliver EGR volumes to the working cylinders. For example, the cylinder event following the dedicated EGR cylinder event is prone to receive more EGR diluent than the subsequent two cylinders. This variation in cylinder makeup (i.e. combustion air, fuel and EGR diluent) results in uneven combustion performance that is difficult to control over a broad range of operating conditions.

SUMMARY

In an exemplary embodiment, an internal combustion engine comprises a cylinder configured to operate on a four-stroke combustion cycle, a dedicated EGR cylinder configured to operate on a two-stroke combustion cycle and an EGR supply conduit extending between an exhaust port of the dedicated EGR cylinder configured to operate on a two-stroke combustion cycle and an intake port of the cylinder configured to operate on a four-stroke combustion cycle, for delivery of exhaust gas exiting the dedicated EGR cylinder configured to operate on a two-stroke combustion cycle to the cylinder configured to operate on a four-stroke combustion cycle for combustion therein.

A V-configured, six cylinder internal combustion engine comprising two cylinder banks comprising three cylinders each. Two adjacent, dedicated EGR cylinders in one of the cylinder banks are operable on a two stroke combustion cycle and four cylinders located in both of the cylinder banks are operable on a four stroke combustion cycle. An EGR supply conduit extends between an exhaust port of the dedicated EGR cylinders configured to operate on a two-stroke combustion cycle and intake ports of the cylinders configured to operate on a four-stroke combustion cycle for delivery of exhaust gas exiting the dedicated EGR cylinders configured to operate on a two-stroke combustion cycle to the cylinders configured to operate on a four-stroke combustion cycle for combustion therein.

The above features and advantages, and other features and advantages of the invention are readily apparent from the following detailed description of the invention when taken in connection with the accompanying drawings.

BRIEF DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
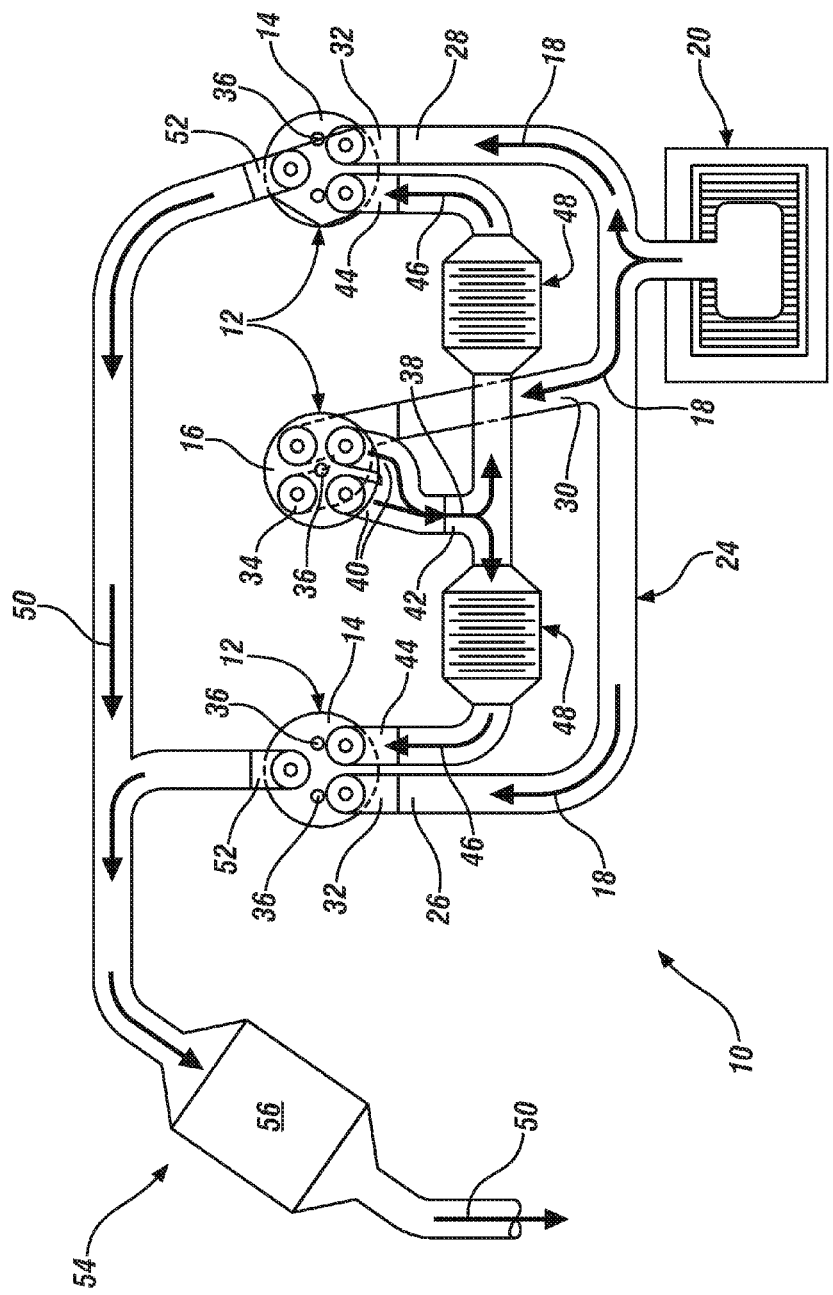
FIG. 1 is a schematic plan view of portions of an internal combustion engine system embodying features of the invention.

The following description is merely exemplary in nature and is not intended to limit the present disclosure, its application or uses. It should be understood that throughout the drawings, corresponding reference numerals indicate like or corresponding parts and features.

Referring now to FIG. 1, an exemplary embodiment of the invention is directed to an internal combustion engine system 10 comprising a plurality of engine cylinders 12. In the embodiment illustrated, the internal combustion engine system 10 includes three engine cylinders 12, however the configuration may also include any number of cylinders (ex. 3, 4, 5, 6, 8, 10, 12, etc.) as well as configurations such as in-line (shown), V-configured, horizontally opposed and the like, without affecting the application of the invention thereto.

Referring to the engine cylinders 12 in the embodiment shown, the first and third cylinders 14 are configured to operate on a four-stroke combustion cycle. Contrarily, the second cylinder 16 is a dedicated EGR cylinder and is configured to operate on a 2-stroke combustion cycle; as will be described in further detail below. Combustion air 18 is compressed by a compressor 20 which may comprise an engine driven supercharger, an exhaust driven turbocharger or a combination of both (i.e. super-turbocharger) and is delivered to each of the engine cylinders 12 through a portion of an intake system 24 comprising intake runners 26, 28 and 30. The intake runners 26, 28 and 30 deliver the compressed combustion air to the 4-stroke cylinders 14 through intake ports 32 and to the 2-stroke cylinder through intake port or ports 34. The combustion air 18 is mixed with fuel in the cylinders 14 and 16, and is combusted therein. One or more ignition devices such as spark plugs 36 are located in communication with the cylinders 14 and 16 and operate to ignite the fuel/air mixture therein.

In an exemplary embodiment, exhaust gas 38 from the combustion of fuel and combustion air 18 in the 2-stroke, dedicated EGR cylinder 16 is removed from the cylinder 16 through one or more exhaust ports 40 in fluid communication with an EGR supply conduit 42 extending between, and in fluid communication with, intake ports 44 that are configured to deliver the exhaust gas 38 to the 4-stroke cylinders 14 as recirculated exhaust gas ("EGR") 46. The recirculated exhaust gas 46 is mixed with the combustion air 18 and fuel in each 4-stroke cylinder 14 prior to combustion thereof. The EGR 46 supplied from the 2-stroke, dedicated EGR cylinder 16 to the 4-stroke cylinders 14 functions to assist in the reduction of throttling losses at low loads and to improve knock tolerance and reduce the level of oxides of nitrogen ("$NO_x$") in the exhaust gas.

In an exemplary embodiment, one or more heat exchangers 48 may be disposed between the 2-stroke, dedicated EGR cylinder 16 and the intake ports 44 of the 4-stroke cylinders 14 to cool the EGR charge 46 allowing for a cooler and, thus, denser flow of EGR into the 4-stroke cylinders 14. The heat exchangers 48 may be of an air cooled or liquid cooled configuration. In an exemplary embodiment, exhaust gas 50 from the combustion of fuel, combustion air 18 and EGR 46 in the 4-stroke cylinders 14 is removed from the cylinders through one or more exhaust ports 52 in fluid communication with an exhaust gas treatment system 54 that may include various exhaust gas treatment devices 56 such as a catalytic converter, a selective catalytic reduction device, a particulate trap or a combination thereof.

Figure 2:
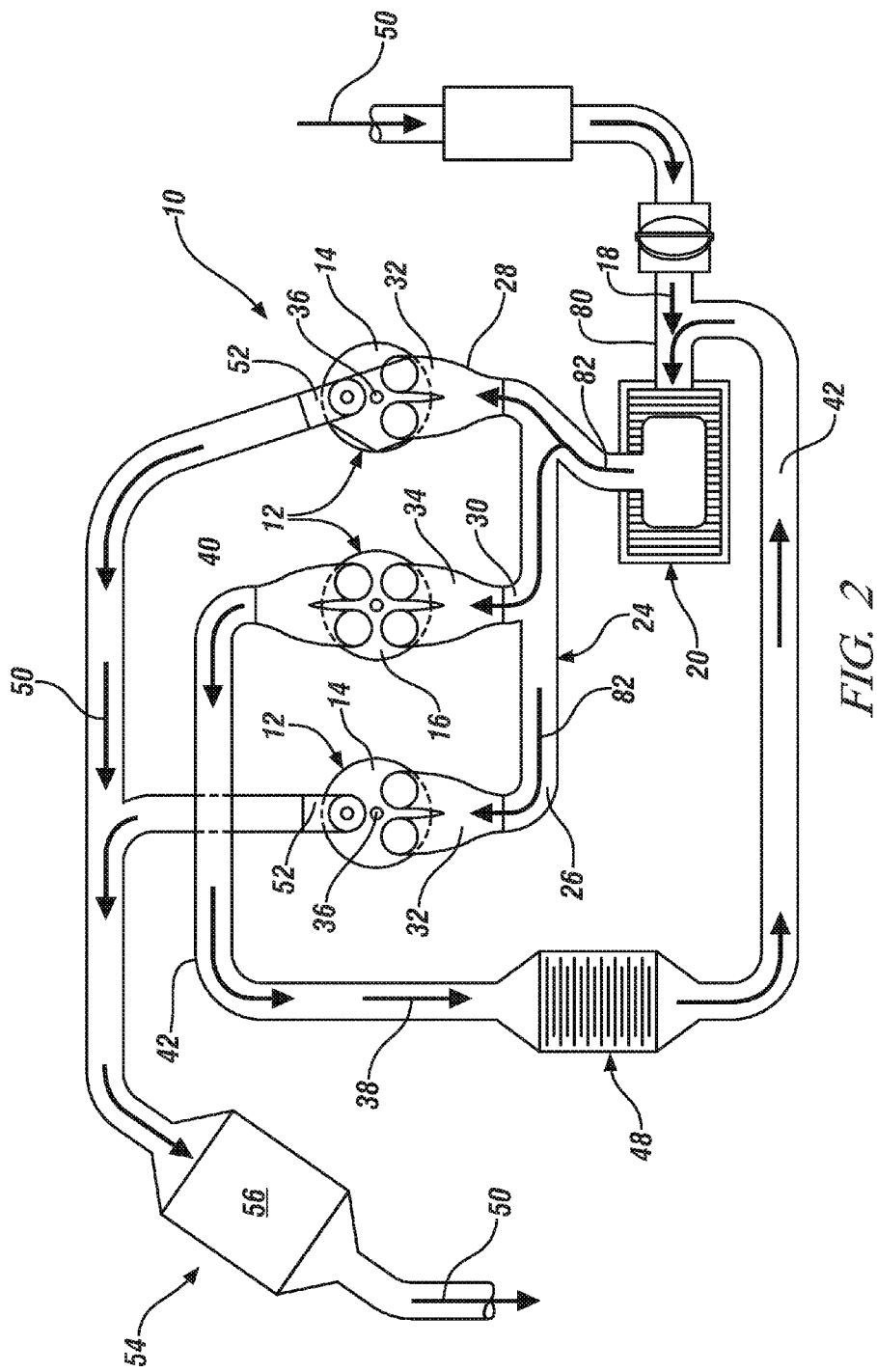
FIG. 2 is a schematic plan view of portions of an internal combustion engine system embodying features of another embodiment of the invention.

Referring now to FIG. 2, another exemplary embodiment of the invention is directed to an internal combustion engine system 10 comprising a plurality of engine cylinders 12. In the embodiment illustrated, the internal combustion engine system 10 includes three engine cylinders 12, however the configuration may also include any number of cylinders (ex. 3, 4, 5, 6, 8, 10, 12, etc.) as well as configurations such as in-line (shown), V-configured, horizontally opposed and the like, without affecting the application of the invention thereto.

Referring to the engine cylinders 12 in the embodiment shown, the first and third cylinders 14 are configured to operate on a four-stroke combustion cycle. Contrarily, the second cylinder 16 is a dedicated EGR cylinder and is configured to operate on a 2-stroke combustion cycle; as will be described in further detail below. Combustion air 18 is compressed by a compressor 20 which may comprise an engine driven supercharger, an exhaust driven turbocharger or a combination of both (i.e. super-turbocharger) and is delivered to each of the engine cylinders 12 through a portion of an intake system 24 comprising intake runners 26, 28 and 30. The intake runners 26, 28 and 30 deliver the compressed combustion air to the 4-stroke cylinders 14 through intake ports 32 and to the 2-stroke cylinder through intake port or ports 34. The combustion air 18 is mixed with fuel in the cylinders 14 and 16, is combusted therein. One or more ignition devices such as spark plugs 36 are located in communication with the cylinders 14 and 16 and operate to ignite the fuel/air mixture therein.

In an exemplary embodiment, exhaust gas 38 from the combustion of fuel and combustion air 18 in the 2-stroke, dedicated EGR cylinder 16 is removed from the cylinder through one or more exhaust ports 40 in fluid communication with an EGR supply conduit 42 extending between, and in fluid communication with, the intake port 80 of the compressor 20 and is configured to deliver the exhaust gas 38 to the compressor 20 for mixture with the combustion air 18 and compression into combustion charge 82. As a result, combustion charge 82 includes a mixture of combustion air 18 and recirculated exhaust gas 38 and is delivered to the to the 4-stroke cylinders 14 through the intake runners 26, 28 and to the 2-stroke cylinder 16 through intake runner 30. The exhaust gas 38 supplied from the 2-stroke, dedicated EGR cylinder 16 to the compressor intake port of the intake system 24 functions to assist in the reduction of throttling losses at low loads and to improve knock tolerance and reduce the level of oxides of nitrogen ("$NO_x$") in the exhaust gas.

In an exemplary embodiment, a heat exchanger 48 may be disposed between the exhaust port 40 of the 2-stroke, dedicated EGR cylinder 16 and the compressor intake port 80 to cool the exhaust gas 38 allowing for a cooler and, thus, denser flow of exhaust gas into the compressor 20. The heat exchanger 48 may be of an air cooled or liquid cooled configuration. In an exemplary embodiment, exhaust gas 50 from the combustion of fuel and the combustion charge 82 in the 4-stroke cylinders 14 is removed from the cylinders through one or more exhaust ports 52 in fluid communication with an exhaust gas treatment system 54 that may include various exhaust gas treatment devices 56 such as a catalytic converter, a selective catalytic reduction device, a particulate trap or a combination thereof.

In an exemplary embodiment, the 4 and 2 stroke cylinders 14, 16, respectively have pistons (not shown) that are connected through connecting rods (not shown) to crankshaft pins (not shown), disposed on a crankshaft (not shown). The crankshaft pins are arranged to enable a "near-even fire" combustion sequence in order to produce, in the case of the 3-cylinder internal combustion engine 10, four nearly evenly spaced firing events in about 720 degrees of rotation of the crankshaft. For example, the crankpin for the 2-stroke, dedicated EGR cylinder 16 may be oriented symmetrically (i.e. slightly more or less than 180 degrees of rotation of the crankshaft) to the crank pins of the 4-stroke cylinders 14 in order to optimize the timing of the delivery of the EGR 46, FIG. 1, or combustion charge 82, FIG. 2, to the 4-stroke cylinders 14. In the embodiments illustrated, in the 3 cylinder in-line internal combustion engine 10, two cylinders can operate on a 4-stroke cycle with the remaining cylinder operating on a 2-stroke cycle to supply recirculated exhaust gas 46 or combustion charge 82 to the 4-stroke cylinders. Such a configuration will yield 4 substantially evenly spaced firing or combustion events in about 720 degrees of crankshaft rotation and yield near 4-cylinder engine performance and combustion smoothness in a in a 3-cylinder engine package 10.

In the embodiments illustrated and described, the internal combustion engine 10 will package in the space of a 3-cylinder, in-line engine but will deliver near 4-cylinder performance. Four firing impulses or events will allow the engine to enjoy a lowered idle speed from about 1000 revolutions per minute ("RPM") to about 750 RPM due to smoother feedback to the vehicle, or other installation, resulting in lower fuel consumption. In addition, the output constituents 38 (i.e.

exhaust gas) of the 2-stroke, dedicated EGR cylinder 16 are "post-processed" by the 4-stroke cylinders 14 allowing the 2-stroke, dedicated EGR cylinder 16 to be operated richer than stoichiometry without an adverse impact on tailpipe emissions 50. This allows the 2-stroke, dedicated EGR cylinder 16 to be optimized as a supplier of EGR diluent to the 4-stroke cylinders 14.

The operation of the internal combustion engine 10 is relatively straight forward and the configuration of the 2-stroke, dedicated EGR cylinder 16 may comprise a number of 2-stroke designs. For instance, in an exemplary embodiment, a "uniflow" design may be implemented which will utilize exhaust valves in fluid communication with the exhaust ports 40. Intake ports 34 may be dispensed with in exchange for intake ports (not shown) at the bottom of the cylinder 16. The cylinder 16 may be crankcase scavenged but also maybe scavenged with pressurized air from the compressor 20. In the exemplary embodiments illustrated in FIGS. 1 and 2, the layout of the 2-stroke, dedicated EGR cylinder 16 is similar to that of a 4-stroke engine in its configuration. The primary difference between 2-stroke and 4-stroke operation of the cylinder 16 is in the valve-injector-spark timing relative to the position of the engine crankshaft (not shown). This configuration benefits from compressed combustion air 18, FIG. 1, or the compressed combustion charge 82, FIG. 2, delivered by compressor 20. In an exemplary embodiment, a compressor 20 may be dispensed with when the exhaust gas treatment system 54 and the timing of the exhaust valves of the 2-stroke cylinder 16 can be controlled to create "auto-scavenging" of exhaust gas from the cylinder 16.

Figure 3:
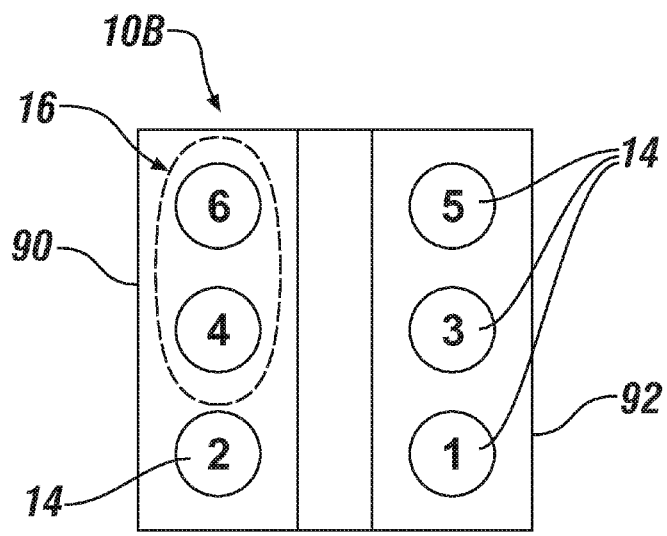
FIG. 3 is a schematic plan view of portions of an internal combustion engine system embodying features of another embodiment of the invention.

As indicated above, the invention is applicable to various engine configurations. In a V-configured engine, such as a V-6 engine, four cylinders can operate on a 4-stroke cycle with the remaining two cylinders operating on a 2-stroke cycle to supply recirculated exhaust gas to the 4-stroke cylinders. Such a configuration will yield 8 firing or combustion events in about 720 degrees of crankshaft rotation and yield near V-8 engine performance in a V-6 package. In the exemplary embodiment of FIG. 3, the V-6 configured internal combustion engine 10B is configured such that two cylinders (4 and 6 in the engine illustrated) on a first cylinder bank 90 are operated on a 2-stroke cycle. The remaining cylinders 1, 2, 3 and 5 which are located in various locations on both first cylinder bank 90 and second cylinder bank 92 operate on a 4 stroke cycle. This configuration is useful in order to optimize the firing order of the cylinders 14, 16 as well as the delivery of recirculated exhaust gas 46 from the 2-stroke cylinders 16 to the 4-stroke cylinders 14.

Figure 4:
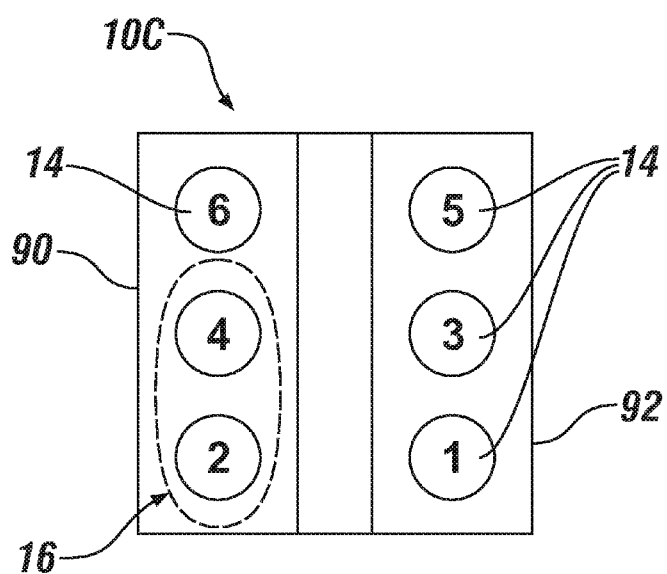
FIG. 4 is a schematic plan view of portions of an internal combustion engine system embodying features of another embodiment of the invention.

In the exemplary embodiment of FIG. 4, the V-6 configured internal combustion engine 10C is configured such that two cylinders (2 and 4 in the engine illustrated) on first cylinder bank 90 are operated on a 2-stroke cycle. The remaining cylinders 1, 3, 5 and 6 which are located in various locations on both first cylinder bank 90 and a second cylinder bank 92 operate on a 4 stroke cycle. This configuration is also useful in order to optimize the firing order of the cylinders 14, 16 as well as the delivery of recirculated exhaust gas from the 2-stroke cylinders 16 to the 4-stroke cylinders 14.

The invention has been described above primarily with reference to its application in a 3-cylinder or a 6-cylinder engine. It should be clear to one skilled in the art of internal combustion engines that engines of other cylinder numbers, and varied configurations, can easily be envisaged and that the invention should not, and can not be limited to those examples provided herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. An internal combustion engine comprising:
    a cylinder configured to operate on a four-stroke combustion cycle;
    a dedicated EGR cylinder configured to operate on a two-stroke combustion cycle; and
    an EGR supply conduit extending between an exhaust port of the dedicated EGR cylinder configured to operate on a two-stroke combustion cycle and an intake port of the cylinder configured to operate on a four-stroke combustion cycle for delivery of exhaust gas exiting the dedicated EGR cylinder configured to operate on a two-stroke combustion cycle to the cylinder configured to operate on a four-stroke combustion cycle for combustion therein.

2. The internal combustion engine of claim 1, further comprising a compressor in fluid communications with an intake port of the cylinder configured to operate on a four-stroke combustion cycle and an intake port of the dedicated EGR cylinder configured to operate on a two-stroke combustion cycle to deliver compressed combustion air for combustion therein.

3. The internal combustion engine of claim 1, further comprising a heat exchanger disposed between the dedicated EGR cylinder configured to operate on a two-stroke combustion cycle and the intake port of the cylinder configured to operate on a four-stroke combustion cycle to cool the exhaust gas.

4. The internal combustion engine of claim 1, further comprising:
    an exhaust port in the cylinder configured to operate on a four-stroke combustion cycle;
    an exhaust gas treatment system in fluid communication with the exhaust port and configured to receive exhaust gas therefrom; and
    an exhaust treatment device disposed in the exhaust treatment system.

5. The internal combustion engine of claim 1, further comprising a second cylinder configured to operate on a four-stroke combustion cycle and to receive exhaust gas exiting the dedicated EGR cylinder for combustion therein and wherein the dedicated EGR cylinder includes a combustion event between each combustion event of the first and second cylinders to provide an even flow of EGR to the first and second cylinders.

6. The internal combustion engine of claim 5, further comprising a second bank of three similarly configured cylinders offset at an angle to define a six cylinder V-configured internal combustion engine.

7. The internal combustion engine of claim 5, wherein the cylinders are configured to operate on a four-stroke combustion cycle and receive exhaust gas from the dedicated EGR cylinders configured to operate on a two-stroke combustion cycle.

8. A V-configured, six cylinder internal combustion engine comprising:
    two cylinder banks comprising three cylinders each;

two adjacent, dedicated EGR cylinders in one of the cylinder banks operable on a two stroke combustion cycle;

four cylinders located in both of the cylinder banks operable on a four stroke combustion cycle; and an EGR supply conduit extending between an exhaust port of the dedicated EGR cylinders configured to operate on a two-stroke combustion cycle and intake ports of the cylinders configured to operate on a four-stroke combustion cycle for delivery of exhaust gas exiting the dedicated EGR cylinders configured to operate on a two-stroke combustion cycle to the cylinders configured to operate on a four-stroke combustion cycle for combustion therein.

9. An 3-cylinder internal combustion engine comprising:

a first and a second cylinder configured to operate on a four-stroke combustion cycle;

a dedicated EGR cylinder configured to operate on a two-stroke combustion cycle; and an EGR supply conduit extending between an exhaust port of the dedicated EGR cylinder configured to operate on a two-stroke combustion cycle and an intake ports of the first and second cylinders for delivery of exhaust gas exiting the dedicated EGR cylinder to the first and second cylinders for combustion therein.

10. The 3-cylinder internal combustion engine of claim 9, further comprising a compressor in fluid communications with intake ports of the first and second cylinders and an intake port of the dedicated EGR cylinder to deliver compressed combustion air for combustion therein.

11. The 3-cylinder internal combustion engine of claim 9, further comprising a heat exchanger disposed between the dedicated EGR cylinder and the intake ports of the first and second cylinders to cool the exhaust gas.

12. The 3-cylinder internal combustion engine of claim 9, wherein the dedicated EGR cylinder includes a combustion event between each combustion event of the first and second cylinders to provide an even flow of EGR to the first and second cylinders.

\* \* \* \* \*